United States Patent [19]

Nicholls et al.

[11] Patent Number: 4,469,315
[45] Date of Patent: Sep. 4, 1984

[54] SELF-PUMPING STRUTS FOR VEHICLE SUSPENSION SYSTEMS

[75] Inventors: Lawrence G. Nicholls, Birmingham, England; George B. Powell, Abergavenny, Wales

[73] Assignee: Lucas Industries, public limited company, Birmingham, England

[21] Appl. No.: 391,352

[22] Filed: Jun. 23, 1982

[30] Foreign Application Priority Data

Jul. 9, 1981 [GB] United Kingdom ................. 8121233

[51] Int. Cl.³ .......................... F16F 9/46; F16F 5/00
[52] U.S. Cl. ................................ 267/64.17; 188/299; 267/64.19; 280/707
[58] Field of Search ............... 267/64.17, 64.19, 64.23, 267/64.27, 64.16; 188/313, 318, 299, 298; 280/707, 708

[56] References Cited

U.S. PATENT DOCUMENTS

| | | | |
|---|---|---|---|
| 2,802,664 | 8/1957 | Jackson | 267/64.17 |
| 3,194,547 | 7/1965 | Avner | 267/64.17 |
| 3,603,576 | 9/1971 | Hahn | 267/64.17 |
| 3,720,425 | 3/1973 | Asano et al. | 267/64.16 |
| 4,270,771 | 6/1981 | Fujii | 267/64.19 |
| 4,293,139 | 10/1981 | Brown | 280/707 |
| 4,361,346 | 11/1982 | Harris | 280/707 |
| 4,368,878 | 1/1983 | Meller et al. | 267/64.17 |

*Primary Examiner*—Bruce H. Stoner, Jr.
*Assistant Examiner*—Robert J. Oberleitner
*Attorney, Agent, or Firm*—Scrivener Clarke Scrivener and Johnson

[57] ABSTRACT

A self-pumping strut comprises radially inner and outer cylinders extending between closure members to define a reservoir space between the cylinders which is partitioned by a cylindrical elastomeric membrane into an hydraulic reservoir space and a gas space.

A piston connected by a piston rod to a wheel slides in the inner cylinder to define a pump chamber and a first working chamber within the inner cylinder. Each chamber communicates with the hydraulic reservoir space by means of a respective solenoid-operated valve. A pump outlet valve incorporated into the piston controls flow of hydraulic fluid between the chambers. The first working chamber is in communication with a second working chamber by means of flap valves, the second working chamber being separated from a gas spring chamber by a diaphragm.

An electronic control unit operates the solenoid-operated valves to adjust the height of the strut, which is detected by a sensor.

5 Claims, 1 Drawing Figure

U.S. Patent
Sep. 4, 1984
4,469,315
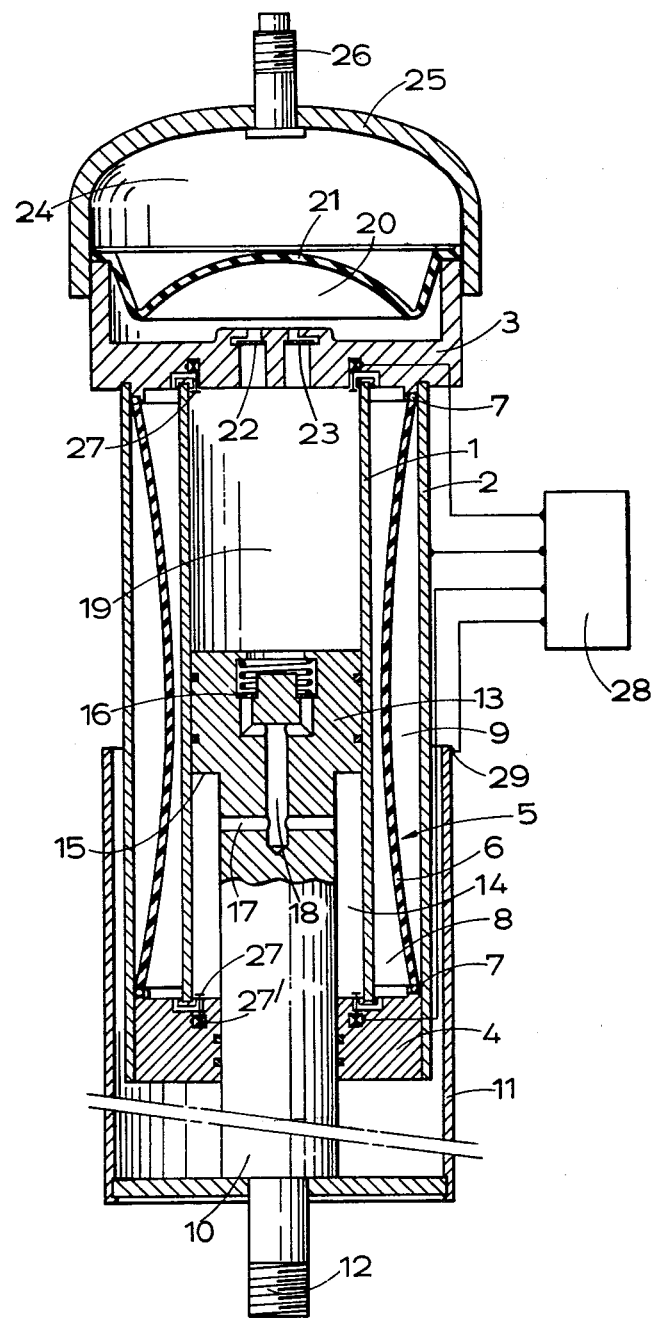

SELF-PUMPING STRUTS FOR VEHICLE SUSPENSION SYSTEMS

SPECIFIC DESCRIPTION

This invention relates to a self-pumping strut for vehicle suspension systems of the kind comprising a pump which is operated by displacement of the strut, the pump being arranged to pump hydraulic fluid from a reservoir to a working space of the strut. Such a strut will hereinafter be referred to as "a strut of the kind set forth".

Known self-pumping struts take fluid from a reservoir on the rebound movement of the strut, that is during extension of the strut, and pump it into a gas-spring chamber on the next bump movement, during contraction of the strut. Pumping is continuous and the rate is controlled simply by a hole in the cylinder of the pump which allows hydraulic fluid to return to reservoir at the correct position of the piston in the cylinder.

Thus, the pumping action produces additional damping during contraction of the strut which produces a harder ride for the vehicle occupants. Also, since the pumping is continuous unnecessary damping is being produced during the period when no adjustment of the strut height is required.

According to one aspect of the invention in a strut of the kind set forth the arrangement is such that the pump displaces hydraulic fluid to a working space during extension of the strut.

Thus the additional damping effect produced during displacement of fluid to the working space is experienced during extension of the strut. The damping produced during extension will be felt much less by the vehicle occupants. Also, in some circumstances this damping can be useful.

Preferably the pump chamber is an annular chamber defined radially between a piston rod of which the lower end is for connection to the vehicle wheel and a cylinder which forms the radially inner wall of the fluid reservoir, and the pump outlet valve from the pump chamber is provided in the piston carried by the upper end of the piston rod.

An inlet valve to the pump chamber is conveniently located at the lower end of the pump chamber.

According to a second aspect of the invention in a strut of the kind set forth a solenoid-operated valve is provided which controls fluid communication between the reservoir and the pump chamber, and control means is provided to open the solenoid-operated valve, or permit it to open, to allow fluid to return from the pump chamber to reservoir when a sensing means detects that displacement of fluid to the working space is not required.

Thus, when no adjustment of the strut is found to be necessary the pump is deactivated, so that the unnecessary damping forces produced with the known designs are avoided. The only damping produced will be that produced in returning fluid from the pump chamber to the reservoir, but this can be controlled as desired.

Suitable sensors for detecting the height of a strut are described in our U.K. patent application No. 2 074 736A. Basically, a sensor coil is mounted on the cylinder of the strut, and movement of the piston rod is detected by the change produced in the inductive characteristics of the coil.

Preferably the solenoid operated valve is the one-way pump inlet valve which normally prevents return of fluid from the pump chamber to the reservoir during the displacement stroke of the pump, but if desired it could be an independent valve arranged in parallel with the one-way valve.

According to a third aspect of the invention in a strut of the kind set forth a solenoid operated valve controls return flow of fluid from the working space to the reservoir chamber.

A self-pumping strut for a vehicle suspension system and in accordance with the invention will now be described, by way of example only, with reference to the accompanying drawing which is a vertical cross-section of the strut, the solenoid valves being indicated schematically.

The strut shown in the drawing is intended to support the full share of vehicle weight at the associated wheel, that is additional support springs are not required. However, the invention is also applicable to struts which are used in conjunction with auxiliary support means.

The illustrated strut comprises radially inner and outer cylinders 1 and 2 respectively extending between a cup-shaped closure member 3 at their upper ends and an annular closure member 4 at their lower ends, a partitioned reservoir space 5 being defined between the cylinders 1 and 2. Space 5 is partitioned into an hydraulic reservoir space 8 and a gas space 9 by a cylindrical elastomeric membrane 6 which is clamped at its upper and lower ends 7 to the outer cylinder 2.

A piston rod 10 carries a dust shield 11 and is adapted at its lower end 12 for supporting a vehicle wheel. At its upper end rod 10 carries a piston 13 which is slidably sealed to the inner wall of inner cylinder 1. An annular pump chamber 14 is defined radially between the piston rod 10 and the inner cylinder 1, and between closure member 4 and the lower face 15 of piston 13. A one-way pump outlet valve in the form of an annular plate valve 16 is provided in the pump piston 13 and controls flow of fluid through bores 17 and 18 from pump chamber 14 to a first working chamber 19 defined within cylinder 1 between piston 13 and closure member 3.

Chamber 19 communicates with a second working chamber 20 defined between an elastomeric diaphragm 21 and member 3 by way of oppositely acting damper valves 22, 23, and a gas spring chamber 24 is defined between diaphragm 21 and a closure cap 25 secured to member 3 and carrying attachment means 26 for connection to a sprung part of the vehicle.

A first solenoid-operated valve is indicated schematically at 27 as an annular valve controlling fluid communication between hydraulic reservoir space 8 and pump chamber 14. The valve 27 is arranged such that in one condition of the solenoid 27' it acts as a one-way valve permitting hydraulic fluid to flow from space 8 to pump chamber 14, but in another condition of the solenoid 27' allowing relatively unrestricted fluid flow in both directions between space 8 and pump chamber 14.

An electronic control unit 28 receives height signals from a sensor indicated schematically at 29, which detects the relative positions of piston rod 10 and cylinder 2, and when the control unit detects that the computed time-average ride height for the strut is correct, the valve 27 is brought to the condition allowing free flow between space 8 and chamber 14 in both directions. In that condition no fluid will be pumped by the pump piston to working chambers 19 and 20 which comprise the working space of the strut.

It will be understood that when valve 27 is arranged to be closed for excess pressure in chamber 14 over that in space 8, downward movement of the pump piston 13 relative to cylinder 1 will result in displacement of fluid through valve 16 to chambers 19 and 20. Thus, when the pump is operative displacement of fluid by the pump to working chamber 20 takes place during extension of the strut.

A second solenoid-operated valve assembly 27 is arranged to control fluid communication between chamber 19 and reservoir space 8 to permit return of fluid to the reservoir space when it is desired to reduce the volume of fluid in working chambers 19 and 20, this being decided by control unit 28.

We claim:

1. A self-pumping strut for vehicle suspension systems comprising a cylinder assembly and a piston rod slidable relative to said cylinder assembly, a piston carried by said piston rod within said cylinder assembly, said cylinder assembly housing a working space for hydraulic fluid bounding said piston, and a reservoir for hydraulic fluid, pump means including an outlet valve housed within said cylinder assembly and operated by displacement of said piston rod relative to said cylinder assembly for pumping fluid from said reservoir through said outlet valve to said working space for increasing the height of said strut, a solenoid-operated valve for controlling reverse flow from said pump means to said reservoir, sensing means for sensing the height of said strut, and control means for opening said solenoid-operated valve to allow fluid to return from said pump means through said solenoid-operated valve directly to said reservoir without passing through said outlet valve when said sensing means detects that displacement of fluid from said reservoir to said working space is not required.

2. A strut as in claim 1 wherein said pump means is arranged for pumping hydraulic fluid from said reservoir to said working space during extension of said strut.

3. A strut as in claim 2 wherein said cylinder assembly comprises a cylinder member which slidably receives said piston, and said pump means includes an annular pump chamber defined radially between said piston rod and said cylinder member, said pump outlet valve being located in said piston for controlling communication between said pump chamber and said working space, said solenoid-operated valve in one condition of the solenoid being closed against reverse flow of fluid from said pump chamber to said reservoir to enable fluid flow through said outlet valve to said working space but in a second condition of the solenoid permitting reverse flow from said pump chamber to said reservoir without passing through said outlet valve on extension of said strut.

4. A strut as in claim 1 and comprising a further solenoid-operated valve responsive to said sensing means for controlling return flow of hydraulic fluid from said working space to said reservoir for reducing the height of said strut.

5. A strut as in claim 1 wherein said solenoid-operated valve constitutes a pump inlet valve of said pump means which in one condition of the solenoid acts as a pressure responsive one-way inlet valve but in a second condition of the solenoid permits two-way flow between said pump means and said reservoir to deactivate said pump means.

* * * * *